April 19, 1927.  1,625,233

A. J. WILLIAMS

ROTARY ENGINE

Filed Aug. 23, 1922  3 Sheets-Sheet 1

Inventor

A. J. Williams

By Lacey & Lacey, Attorneys

April 19, 1927.

A. J. WILLIAMS

ROTARY ENGINE

Filed Aug. 23, 1922   3 Sheets-Sheet 2

1,625,233

Inventor
A. J. Williams
By
Lacey & Lacey, Attorneys

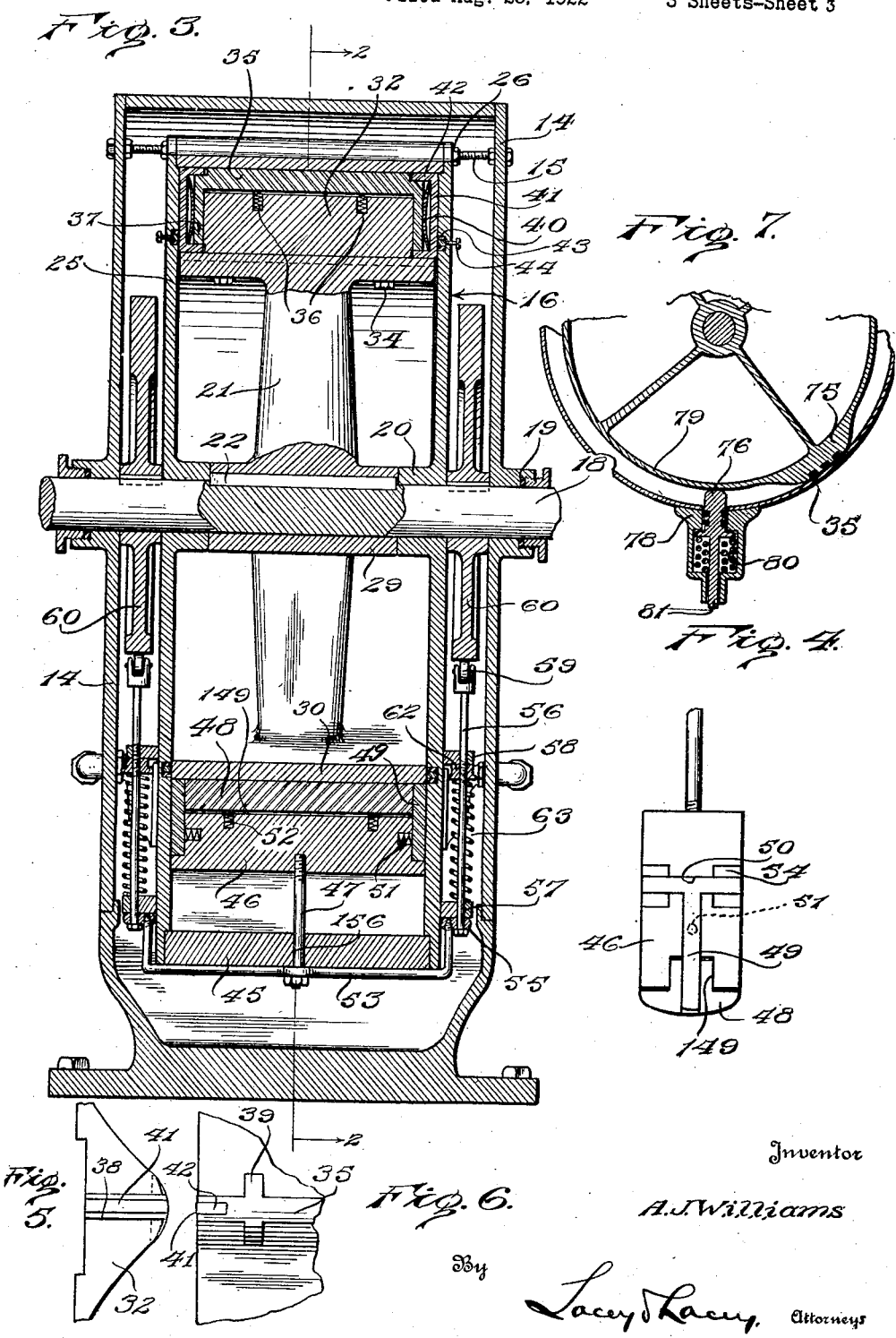

Patented Apr. 19, 1927.

1,625,233

UNITED STATES PATENT OFFICE.

ARTHUR J. WILLIAMS, OF NASHVILLE, TENNESSEE, ASSIGNOR OF ONE-FOURTH TO CHEEVER J. CAMERON, ONE-FOURTH TO WILLIAM F. GLENN, JR., AND ONE-FOURTH TO IVO B. GLENN, ALL OF NASHVILLE, TENNESSEE.

ROTARY ENGINE.

Application filed August 23, 1922. Serial No. 583,842.

The present invention relates to rotary engines comprising a stator and a rotor, which are so constructed that the engine may be used either as a rotary steam engine or a rotary pump depending on how the fluid is directed through the engine. In other words the engine may be used for pumping water and other liquids or utilized as a steam engine producing power under steam pressure. It has the same characteristics as all other rotary engines, that is, it works with a continuous rotary motion in one direction and is provided with valves and gearings for reversing the action of the motor.

The main object of this invention is to provide a motor or engine of this type of simple construction, which can develop a great amount of power for a minimum amount of fuel. Another object of the invention is to minimize vibration and friction in the engine, making all parts light but durable and very accessible and which as a consequence may be built at a low cost, but at the same time is very simple and not likely to get out of order.

One embodiment of the invention is illustrated in the accompanying drawings in which, Fig. 1 represents a side elevation with the end plate partly broken away;

Fig 3 is an axial section of the engine along line 3—3 of Figure 1;

Fig. 4 is an end view of a valve;

Fig. 5 is a fragmentary end view of a piston;

Fig. 6 is a plan view of Fig. 5.

Fig. 7 is a fragmentary section similar to Fig. 2 of a slightly modified rotor and abutment construction.

Figure 1:
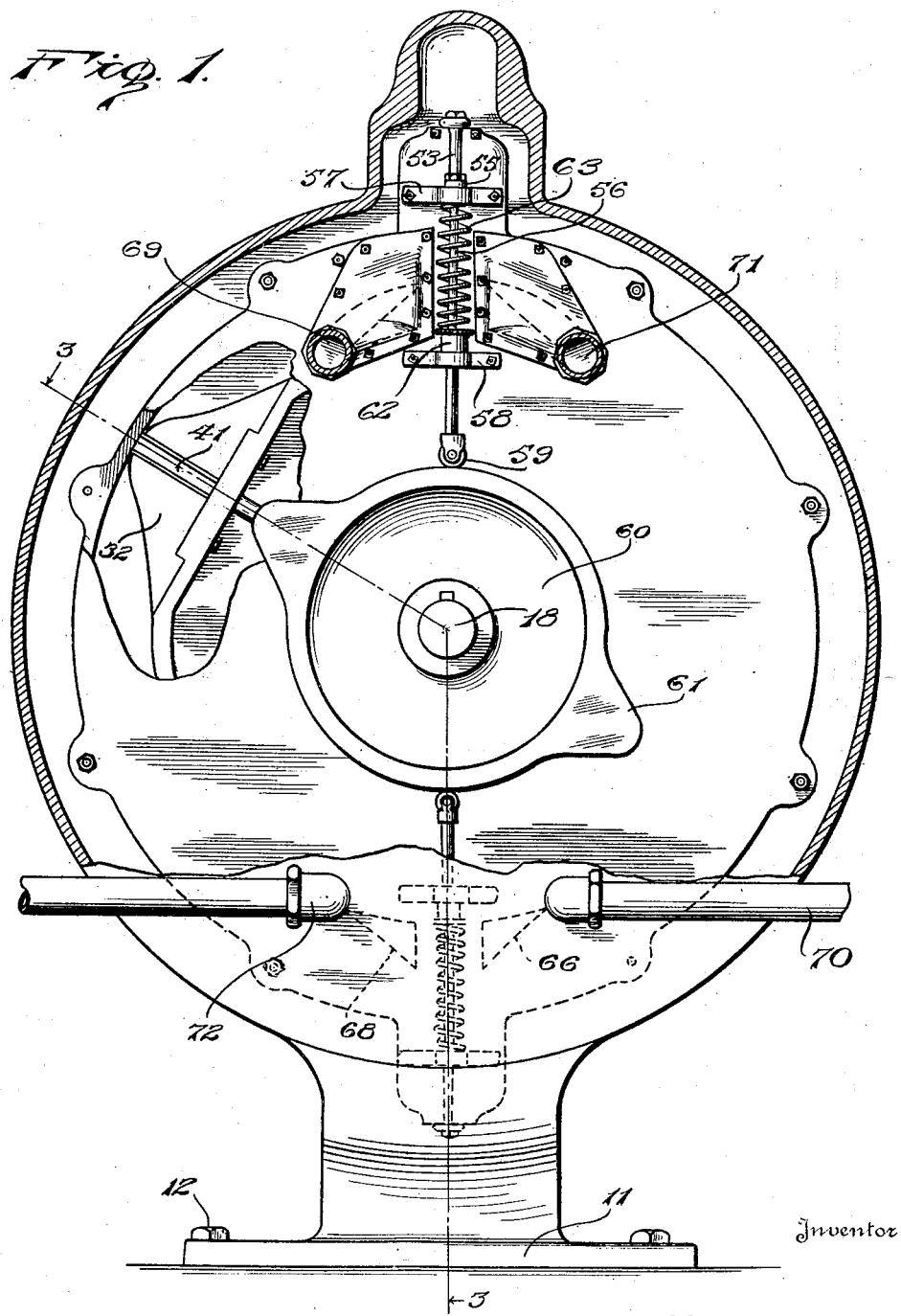

In the drawings reference numeral 10 represents a housing for the engine which is preferably provided with a base 11 firmly secured on the foundation by means of bolts 12 or the like. The housing has a cylindrical shell 13 which is closed at both ends by means of end plates 14 secured by bolts 15 running all the way across the housing. This housing forms an oil and water tight jacket around the stator 16, which is suspended within the housing on bolts 15 and placed therein in such a manner, that a wide space 17 is provided all around the stator as well as on both sides thereof. This space may be filled with oil or water for the easy running of the movable parts of the engine and to insure against leakage. Centrally mounted in the housing 10 is the main shaft 18 carried in suitable bearings 19 in the housing and similar bearings 20 in the stator. The main shaft is revolubly mounted in these bearings and carries rigidly secured thereon the rotor 21, a key 22 being preferably provided for this purpose.

The stator 16 preferably consists of two shells 23 bolted to a pair of sliding abutment or gate casings 24 situated diametrically opposite each other here shown in a vertical plane. The open ends of the stator are closed by means of side plates 25 also secured by bolts 15 and suitable clamping nuts 26. In this manner the stator contains a cylindrical chamber 27 within which the rotor 21 is housed.

The rotor is constructed in the form of a wheel with four spokes 28 integral with the hub 29 and also with the cylindrical outer wall 30 of the rotor. This cylindrical wall is flattened in two places diametrically opposite each other providing seats 31 for pistons 32. The diameter of the cylindrical wall 30 is considerably less than the inner diameter of the stator 16, so as to provide a space constituting the steam chamber between them. From the outer periphery of the cylindrical wall 30 the pistons rise forming a ridge as at 33, the apex of which is slightly spaced from the inner periphery of the cylindrical wall 23 of the stator. The pistons 32 are rigidly secured by means of screws 34 and the ridge 33 of each piston has a groove reaching from end to end thereof and intended to receive a packing bar 35 pressed outwardly by means of springs 36 seated in recesses in each piston and tending to press the packing in radial direction to contact with the inner surface of the cylindrical wall 23. The ends of the packing bars 35 have radial fingers 37 engaging in corresponding grooves 38 in the pistons 32. Each packing bar 35 has a pair of wings 39 directed circumferentially of the rotor for a purpose that will be described later. At each end of the packing bars 35 are radial grooves intended to receive springs 40 in the bottom thereof and end packings 41 pushed outwardly by said springs to form a tight joint with the side walls 25 of the stator. These end packings 41 have inwardly directed projections 42 engaging in notches provided in the packing bar 35 for the purpose of holding the end packings radially connected with the packing bars.

At 43 is shown an end packing for the rotor carried in the end walls 25 of the stator and provided with compression spring and adjusting screw 44. This packing is intended to exert a pressure in axial direction against the cylindrical end of the rotor to form a tight joint therewith.

The casing 24 has an outwardly directed lug or pocket 45 which is hollowed out to accommodate the sliding abutment or gate 46. This consists of a block of rectangular shape suspended centrally by means of a bolt 47 upon a cross bar or walking beam 53. This sliding abutment or gate is provided with a loosely mounted T-head 48 seated in a recess 149 along the inner edge of the sliding abutment or gate 46 and pressed continuously in that direction by suitable springs 52, so as to contact with the outer periphery of the rotor and the pistons. At each end of the gate or sliding abutment 46 are provided end packings 49 of T-shape, which are seated in the grooves provided in the ends of the sliding abutment or gate 46 and pressed outwardly against the side walls of the stator by means of suitable springs 51, the long shank of the T of these end packings extends in radial direction through the T-head or packing carrier 48 engaging therewith. Other packings 54 are also provided in the sides of the sliding abutment or gate 46.

The beams 53 are situated outside of the valve casing 45 and extend across the same terminating with ears 55 engaging with the outer ends of operating rods 56. The bolt 47 attaching the sliding abutment or gate 46 to the beam 53 runs through a suitable aperture 156 furnished for this purpose in the casing 45. The rods 56 are guided in lugs 57 and 58 on the sides of the stator and the inner ends of the rods 56 carry a roller 59. On each side of the stator a cam disk 60 is rigidly secured on the main shaft 18 so as to revolve therewith. This disk is provided with cams 61 situated at the outer periphery of each disk and diametrically opposite each other and the rollers 59 are adapted to roll along the cylindrical surface and the cam surfaces of the disks. Between the outer ear 57 and an adjusting nut 62 threaded on the rod 56, is inserted a coiled spring 63 tending to hold the roller in contact with the outer surface of the disks 60. As best seen in Fig. 3 the rods 56 are engaged in pairs and the cams 61 on the disks are situated exactly opposite each other so as to simultaneously operate their respective rollers and in this manner raise the sliding abutments or gates carried on the beams 53. The height of the cams 61 above the cylindrical surface of the disks 60 corresponds to the radial distance between the cylindrical walls 23 and 30, so that when the rollers engage with the cylindrical surface of the disks 60 the T-head 48 on each sliding abutment or gate will contact with the outer surface of the cylindrical wall 30, and when the apex of the cams 61 are situated opposite the rollers, each sliding abutment or gate will be lifted an amount corresponding with the distance between the cylindrical walls 23 and 30. In this manner the weight of the sliding abutments or gates and the pressure exerted by the coiled springs 63 will be supported entirely upon the cam disks, so that the pressure against the rotor will only be equal to the weight of the T-head 48 and the spring pressure behind it.

At 65 and 66 are shown intake ports for live steam, in case the engine is utilized as a rotary steam engine; these ports being provided in each of the end plates of the stator and positioned diametrically opposite each other. Similarly, reference numerals 67 and 68 represent exhaust ports, which are also positioned diametrically opposite each other in each of the side plates but symmetrically as regards the intake ports on the other side of the vertical plane of the engine. There are accordingly eight of these ports altogether and suitable intake pipes 69 and 70 and exhaust pipes 71 and 72 are consequently provided for these ports. It will be evident that with suitable valve arrangement the steam might be taken in from pipes 71 and 72 and exhausted through pipes 69 and 70 in this manner reversing the engine. The shape of these ports is triangular and the slanting sides of the ports coincide with the inclined side surfaces of the fixed pistons 32. It will thus be seen that when the fixed pistons 32 stand in the vertical plane, the pistons will entirely cover the ports thereby cutting off both the intake and the exhaust.

Referring particularly to Fig. 1 it should be noted that the cams 61 and disks 60 are positioned to substantially point in the same direction as the pistons 32. However, it is advisable to slightly advance the cams 61 as regards the pistons 32, such advancement amounting only to ten one-thousandths $\left(\frac{10}{1000}\right)$ of an inch at the apex of the cam.

Figure 2:
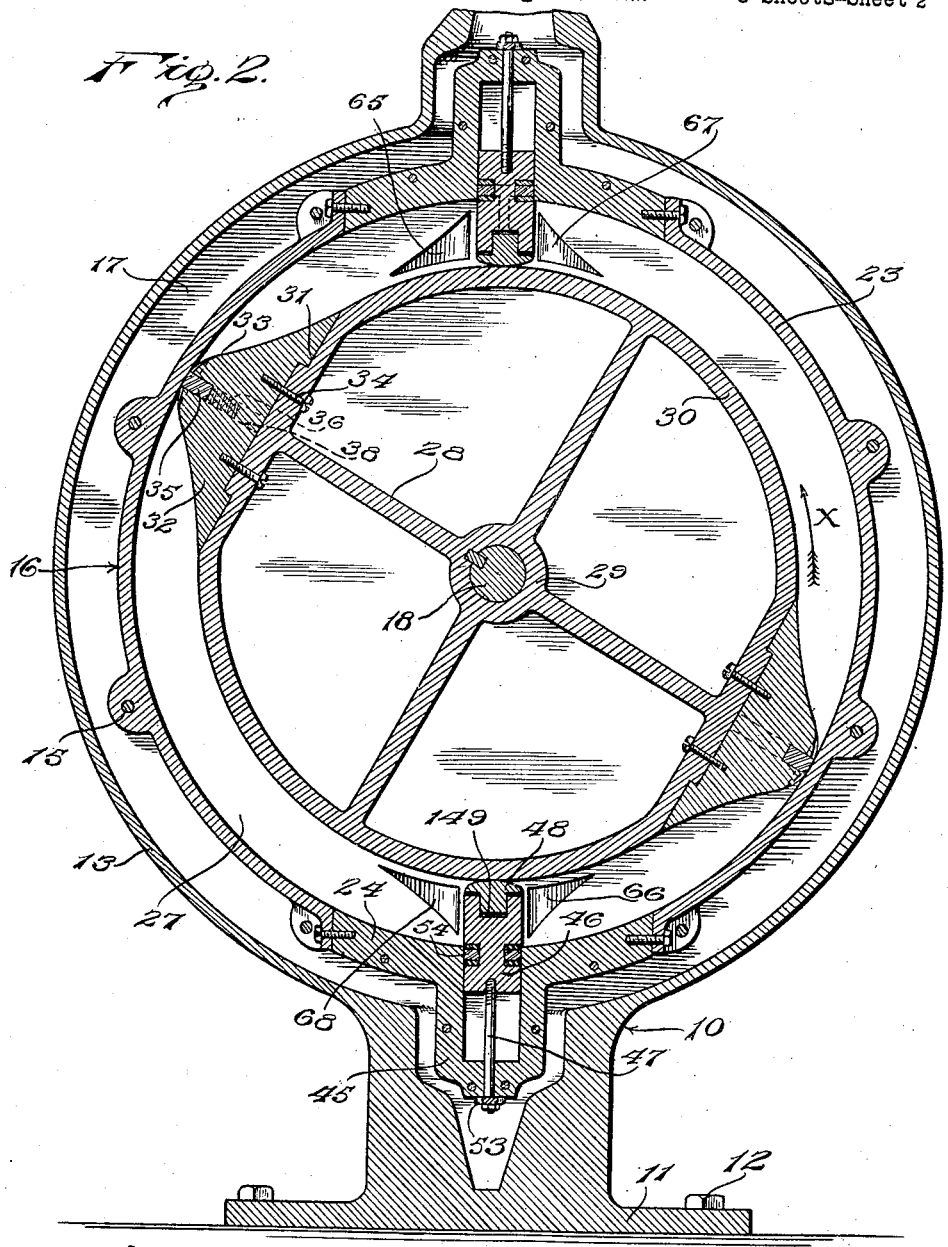
Fig. 2 is a vertical section along line 2—2 of Fig. 3.
Figure 8:
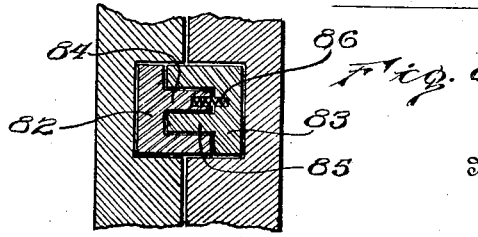
Fig. 8 is a sectional detail of a packing construction suitable for the engine.

The operation of the engine is as follows:

Supposing that the rotor is intended to run in direction of arrow X, Fig. 2, the ports 65 and 66 then serve as intake ports, while the others, 67 and 68 serve as exhaust ports. When the pistons 32 are situated in the vertical plane of this figure, all the ports will be closed, but directly the piston has advanced slightly in the direction of arrow X, the ports 67 and 68 begin to open while the intake ports 65 and 66 remain closed. The cams 61 having in the meantime raised the sliding abutments or gates 46 so that the T-head or packing carrier 48 will pass over the apex 33 of the pistons. It will be noted that the wings 39 of the packing bar 35 having greater spread than the width of the recess in the valve housing, will bridge the same in this manner preventing the packing bar to slip into the same. Soon after the apex of each piston 32 has passed the vertical plane of the engine, the rear face of the piston will reach a cylindrical housing, a concentrically disposed cylindrical stator arranged therein, means extending through the housing from end to end thereof removably mounting the stator and fixedly suspending the stator to define a surrounding lubricant chamber between the stator and housing, the stator being provided with inlet and exhaust ports, a rotor journaled in the stator and provided with pistons controlling said ports, sliding abutments carried by the stator to cooperate with the rotor, and means disposed in said chamber for actuating said abutments.

2. In a rotary engine, the combination of a cylindrical housing, a concentrically disposed cylindrical stator arranged therein housing, a concentrically disposed cylindrical stator arranged within the housing, end plates closing the stator, means extending from end to end of the housing through the end plates thereof removably mounting the stator and securing the end plates of the stator thereon, and the end plates of the housing upon the housing as well as fixedly sustaining the stator to define a surrounding lubricant chamber between the stator and housing, the stator being provided with inlet and exhaust ports, a rotor journaled in the stator and provided with pistons controlling said ports, sliding abutments carried by the stator to cooperate with the rotor, and means disposed in said chamber for actuating said abutments.

6. In a rotary engine, the combination of a cylindrical housing, a concentrically disposed cylindrical stator arranged therein and having its circumferential wall provided with oppositely disposed openings, said wall of the stator being provided at said openings with flanges, means extending through the housing from end to end thereof removably mounting the stator and fixedly suspending the stator to define a surrounding lubricant chamber between the stator and housing, the stator being provided with inlet and exhaust ports, a rotor journaled in the stator and provided with pistons controlling said ports, casings fitting in said openings in the wall of the stator and provided with radial pockets, fastening devices extending through said flanges and engaged with the casings for securing the casings in position, abutments slidable in said pockets to cooperate with the rotor, and means disposed in said chamber for actuating said abutments.

In testimony whereof I affix my signature.

ARTHUR J. WILLIAMS. [L. S.]